(12) United States Patent
Foelster et al.

(10) Patent No.: US 7,533,934 B2
(45) Date of Patent: May 19, 2009

(54) VEHICLE SEAT

(75) Inventors: Thomas Foelster, Grafenau (DE);
Thomas Heckmann, Aidlingen (DE);
Marcus Scheu, Maichingen (DE);
Juergen Schrader, Weil im Schoenbuch (DE); Peter Scott, Maichingen (DE)

(73) Assignee: Daimlerchrysler AG, Stuttgart (DE)

( * ) Notice: Subject to any disclaimer, the term of this patent is extended or adjusted under 35 U.S.C. 154(b) by 109 days.

(21) Appl. No.: 11/725,642

(22) Filed: Mar. 19, 2007
(Under 37 CFR 1.47)

(65) Prior Publication Data
US 2008/0012403 A1 Jan. 17, 2008

Related U.S. Application Data

(63) Continuation of application No. 11/496,864, filed on Jul. 31, 2006, now abandoned, which is a continuation of application No. 11/286,163, filed on Nov. 22, 2005, now abandoned, which is a continuation of application No. 11/090,630, filed on Mar. 25, 2005, now abandoned, which is a continuation of application No. 10/890,564, filed on Jul. 12, 2004, now abandoned.

(30) Foreign Application Priority Data
Jul. 12, 2003 (DE) ................. 103 31 618

(51) Int. Cl.
*B60N 2/28* (2006.01)
(52) U.S. Cl. ...................................... 297/253
(58) Field of Classification Search ................. 297/253, 297/344.1, 452.18, 340, 316, 338, 463.1, 297/250.1
See application file for complete search history.

(56) References Cited

U.S. PATENT DOCUMENTS

| 6,082,818 | A | 7/2000 | Muller | |
| 6,196,628 | B1 * | 3/2001 | Goy et al. | 297/253 |
| 6,234,572 | B1 * | 5/2001 | Shiino et al. | 297/253 |
| 6,361,115 | B1 | 3/2002 | Aufrere et al. | |
| 6,513,873 | B2 * | 2/2003 | Tsuda et al. | 297/253 |

(Continued)

FOREIGN PATENT DOCUMENTS

DE 196 50 087 12/1997

(Continued)

*Primary Examiner*—Milton Nelson, Jr.
(74) *Attorney, Agent, or Firm*—Kenyon & Kenyon LLP (57) ABSTRACT

A vehicle seat includes a seat cushion having seat upholstery and a seat back having a seat back upholstery which are held in a seat framework that is anchored to a vehicle floor in a longitudinally shiftable manner, and includes at least one swivelable holding bracket, for the detachable fastening of a child's seat, set upon the seat cushion, on the seat framework, which is swivelable from a covered, non-use position into a functional position, in which it is accessible, all the way through, between seat back upholstery and seat upholstery. For the creation of a vehicle seat, e.g., having electromotive seat adjustment for longitudinal seat adjustment, seat cushion vertical setting and seat cushion depth setting, in a longitudinal shifting position of the seat upholstery which is determined so that the seat upholstery is moved out of the swivel path of the holding bracket, the swivel motion of the holding bracket is derived from the vertical adjustment motion of the seat cushion.

12 Claims, 5 Drawing Sheets

U.S. PATENT DOCUMENTS

| | | | |
|---|---|---|---|
| 6,547,329 B2 * | 4/2003 | Deptolla | 297/253 |
| 6,604,793 B2 | 8/2003 | Habedank | |
| 7,178,873 B2 * | 2/2007 | Foelster et al. | 297/253 |
| 2004/0080195 A1 * | 4/2004 | Adams et al. | 297/253 |

FOREIGN PATENT DOCUMENTS

| | | |
|---|---|---|
| DE | 197 15 875 | 10/1998 |
| DE | 100 04 598 | 5/2001 |
| DE | 101 28 670 | 6/2002 |
| DE | 101 01 117 | 7/2002 |
| EP | 0 987 141 | 3/2000 |

* cited by examiner

VEHICLE SEAT

CROSS-REFERENCE TO RELATED APPLICATIONS

The present application is a continuation of U.S. patent application Ser. No. 11/496,864, filed on Jul. 31, 2006 now abandoned, which is a continuation of U.S. patent application Ser. No. 11/286,163, filed on Nov. 22, 2005 now abandoned, which is a continuation of U.S. patent application Ser. No. 11/090,630, filed on Mar. 25, 2005 now abandoned, which is a continuation of U.S. patent application Ser. No. 10/890,564, filed on Jul. 12, 2004 now abandoned, which claims priority to Application No. 103 31 618.3, filed in the Federal Republic of Germany on Jul. 12, 2003, each of which is expressly incorporated herein in its entirety by reference thereto.

FIELD OF THE INVENTION

The present invention relates to a vehicle seat.

BACKGROUND INFORMATION

In a conventional vehicle seat (see German Published Patent Application No. 197 15 875 or German Published Patent Application No. 196 50 087) having a seat back that is tiltable forward onto the seat cushion about a tilt axis that is fastened to the seat framework, the at least one holding bracket for retaining the child's seat with the aid of a crosspiece is fastened on a swivel shaft, which is rotatable about a swivel axis that is parallel to the tilt axis of the seat back. The at least one holding bracket may be swivelled about this swivel axis from a non-use or rest position to a use or functional position, and vice versa. In the non-use position, the holding bracket is arranged behind the seat cushion and under the seat back, so that it is covered by both of them, and in the functional position the holding bracket is brought through at the abutting surface between the seat cushion and the seat back upholstery. In order to create the necessary free space for an unhindered swivel movement of the at least one holding bracket, the seat back is tilted forward, which causes the seat back upholstery to swivel out of the swivel space of the holding bracket, and at the same time the holding bracket is swivelled into its functional position via a gear system. After the holding bracket swivels forward, the seat back is set upright again. A mechanical closure fastened to the child's seat is pushed onto the holding bracket that is in its functional position, and it latches onto the holding bracket.

A conventional retaining system for a child's seat carried along in a motor vehicle (see European Published Patent Application No. 0 987 141) is designed for a vehicle seat having a seat part and a seat back held to it, which is equipped with a vertical setting device and a longitudinal setting device, so that the seat user may set both the height of the seat and the distance of the seat from the front of the passenger cell on an individual basis. The retaining system has a locking part device extending in the lower seat back region at a seat height transversely through the seat back at which, at a distance, two holding brackets coupled to each other, that are able to be swivelled from a non-use position into a functional position are formed, which in the functional position are used for the detachable fastening of the child is seat. The swiveling of the holding brackets takes place by pressing a button protruding from the side of the seat back. A locking mechanism provides that the press button is only able to be operated when the vehicle seat is in its highest vertical setting and in its hindmost longitudinal setting, i.e., the greatest seat height and the greatest distance from the front of the passenger cell. The locking mechanism includes two sliding bolt fixtures which are coupled via Bowden cables to the vertical and longitudinal setting of the vehicle.

In a conventional device for the detachable fastening of a child's seat to a vehicle seat (see German Published Patent Application No. 101 28 670), the holding brackets referred to as so-called Isofix brackets for the detachable fastening of the child's seat are rigidly connected to a transverse tube which extends between the two frame side parts of the seat framework and is supported rotatably in the frame side parts. On the outside of the transverse tube there is an operating element in the form of a manual lever, with the aid of which the transverse tube, and thereby the holding bracket, is able to be swivelled. In the functional position, the crosspiece of the holding bracket is located in the gap between the seat upholstery and the seat back upholstery, and in the non-use position it is located underneath the seat back upholstery. Behind the seat upholstery and underneath the seat back upholstery a sufficiently large free space is created for swiveling the holding bracket.

In a conventional vehicle seat, having a seat part and a seat back (see German Published Patent Application No. 100 04 598), the seat part has a seat part structure having two lateral flanges which, in their flange sections located close to the seat back, are rigidly connected to each other by a transverse tube. Two holding brackets that are at a distance from each other, for fastening a child's seat, are bent from an anchoring wire such that they have, on the one hand, in each case a loop for fastening device developed at the child's seat to be hooked into, and, on the other hand, are laid around the transverse tube, by the pulling of the loop, the anchoring wire being pulled tight on the transverse tube.

SUMMARY

An example embodiment of the present invention may provide a vehicle seat, e.g., a front passenger seat, having at least one holding bracket for securing a child's seat, placed on the vehicle seat, which is covered in the non-use position and which may require neither tiltability of the seat back for transferring it into its functional position, nor separate manual operation.

The vehicle seat according to an example embodiment of the present invention may provide that, in order to bring the at least one holding bracket, for securing the child's seat, from the covered storage position into the accessible functional position, no separate operating element or no tilting seat back may have to be operated, which, in the case of front passenger seats of four-door passenger motor vehicles or front passenger seats having electromotive seat adjustment may not be present. Only adjustment devices present on the vehicle seat may be used for producing the function of securing the child's seat, such as that for longitudinal seat adjustment, seat cushion depth adjustment and the device for vertical adjustment of the seat cushion. Since these seat adjustments are already being made with few exceptions by electric motors, bringing on the function of securing the child's seat via electrical seat adjustment may also be accomplished. If there is a seat memory in which individually desired seat positions are stored for various vehicle passengers and are retrieved for the automatic setting of the seat position, a child's seat mode may be stored in the seat memory, via which a seat cushion shift and a seat cushion height adjustment for the swiveling of the holding bracket may be automatically retrievable, and thereby the functional production of the holding bracket for the use of the child's seat may be brought on automatically. In this context, the child's seat mode may be specified such that seat cushion and seat back not only take on an optimal position (seat back and seat cushion inclination, height and longitudinal adjustment, etc.) for installing the child's seat, but that they may also take on an optimal position with regard to safety aspects.

According to an example embodiment of the present invention, before one end of the height adjustment path of the seat cushion, an adjustment path section is defined such that, in response to this adjustment path section being run through, the at least one holding bracket may be swivelled from its rest position into its functional position or vice versa. The adjustment section, in this context, may be selected such that the seat frame reaches the maximum possible height setting at the end of the adjustment path section.

According to an example embodiment of the present invention, a vehicle seat includes: a seat framework anchored to a vehicle floor in a longitudinally shiftable manner; a seat cushion including a seat upholstery, the seat cushion arranged in the seat framework in a vertically adjustable manner, the seat upholstery arranged longitudinally shiftable in the seat framework; a seat back including a seat back upholstery and arranged on the seat framework; and at least one swivelable holding bracket on the seat framework adapted to detachably fasten a child seat that is set upon the seat cushion, the holding bracket swivelable from a covered non-use position to a use position, in the use position the holding bracket penetrating through a lower edge of the seat back upholstery and a rear edge of the seat upholstery and accessible to a retaining device fixed on the child seat, in a longitudinal displacement position of the seat upholstery in which the seat upholstery is moved out of a swivel path of the holding bracket, swivel motion of the holding bracket is derived from a vertical adjustment motion of the seat cushion.

Before an end of a vertical adjustment path of the seat cushion, an adjustment path section may be provided, and the holding bracket may be swivelable between the non-use position and the use position in response passing through to the adjustment path section.

The seat cushion may achieve a maximum possible vertical setting at an end of the adjustment path section.

The vehicle seat may include: guide rails fastened to the vehicle floor, the seat framework arranged longitudinally shiftable on the guide rails, the seat framework include a height-adjustable seat frame, the seat cushion held longitudinally shiftable in the seat frame; a vertical adjustment device engaged at the seat framework and at the seat frame configured to vertically adjust the seat cushion in the seat framework; a two-part coupling including a first coupling part arranged on the vertical adjustment device and a second coupling part arranged on the seat framework; and a control member fastened at at least one guide rail and configured to push, in a fixed longitudinal displacement position of the seat cushion, the second coupling part into a motion path of the first coupling part to carry the second coupling part along with the first coupling part.

The seat cushion may include a seat shell. The seat upholstery may be arranged to rest in the seat shell, and the seat shell may be connected to the seat frame via longitudinal guides.

The vertical adjustment device may include an adjustment arm longitudinally shiftable for vertical adjustment. The adjustment arm may be connected to the seat frame via a lever mechanism and connected to the seat framework via an extended hole guide. The first coupling part may include a locking pin extending from the adjustment arm, and the second coupling part may include a hook configured to be lifted vertically by the control member connected to the lever mechanism that activates the holding bracket via a Bowden cable.

The hook may be fixed at a free end of a leaf spring fastened in the seat framework. The leaf spring may include a control tab bent outwardly and extending into a shifting path of the control member. The control member may include a cam lobe onto which, in a specified longitudinal shifting position of the seat framework, the control tab extends and the free end of the leaf spring that carries the hook lifts.

The seat framework may be pushed back to a maximum in the guide rails in the longitudinal shifting position of the seat framework that activates the control member.

The vehicle seat may include: a memory configured to store seat settings and to retrieve a child seat mode to automatically retrieve the seat setting; and an electromotive seat adjustment device configured automatically and electromotively to transfer the holding bracket into the use position in assignment to the child seat mode, to shift the seat upholstery longitudinally in the seat frame, to shift the seat framework longitudinally in the guide rails and to vertically adjust the seat frame in the seat framework.

The vehicle seat may include: a swivel shaft held in a swivelable manner to the seat frame and extending transversely to a longitudinal axis of the seat, the holding bracket rigidly connected to the swivel shaft; and a swivel lever rotatably fixed on the swivel shaft, the swivel lever including a free end configured to engage to a Bowden cable.

A respective holding bracket may be arranged at each end of the swivel shaft.

Each of two end sections of the swivel shaft may be bent out in a U-shape to form a holding bracket by a short leg that extends from the swivel shaft at a right angle, a long leg that extends parallel to the short leg and a crossbar that connects the short leg and the long leg to each other. An end section of the long leg may extend out over the short leg and may be bent over parallel to the crossbar to close the U to form a rectangle. The end section of the long leg may be swivelably fastened to a cross part of the seat frame by a clip bracket.

Example embodiments of the present invention are described below with reference to the appended Figures.

DETAILED DESCRIPTION

Figure 1:
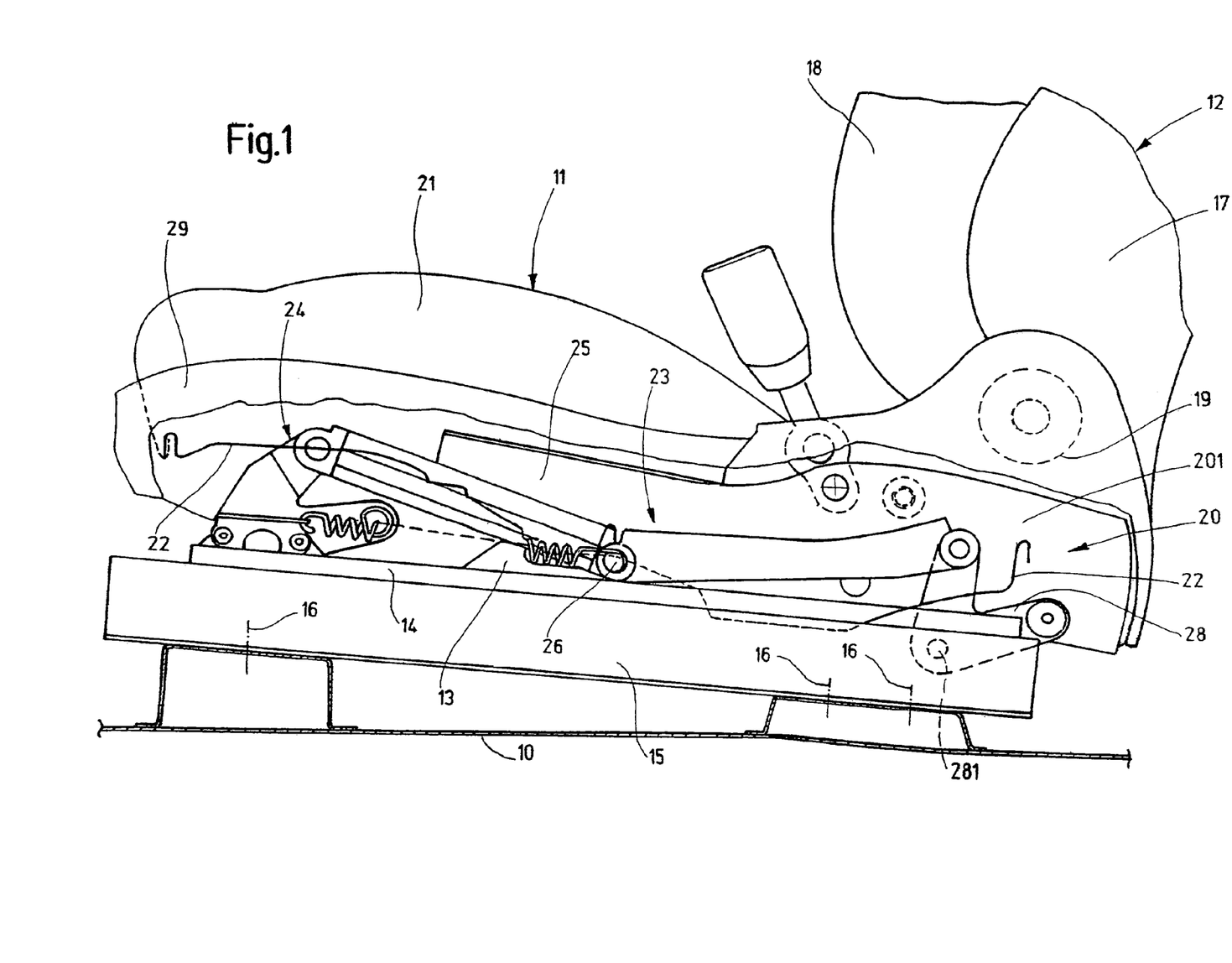
FIG. 1 is a partial cross-sectional side view of a front passenger seat for a passenger motor vehicle.

The vehicle seat for a vehicle, e.g., a passenger motor vehicle, illustrated in a cutaway view in FIG. 1 in a side view and partly in cross-section, and in FIGS. 2 to 5 in various individual views, has a seat framework 13 that is longitudinally shiftable and anchored to a vehicle floor 10, and in which a seat cushion 11 and a seat back 12 are accommodated. On seat framework 13 two parallel slide rails 14 are arranged, which are supported, e.g., by roller bearings in guide rails 15, for longitudinal shifting. Guide rails 15 are firmly anchored to vehicle floor 10. Fastening screws 16 for anchoring guide rails 15 are illustrated schematically in FIG. 1.

Seat back 12 has a seat back frame 17 and a seat back cushion 18 held in seat back frame 17. Seat back frame 17 is held, able to be swivelled about a horizontal axis via a seat back fitting 19, to seat cushion 11, and actually at a seat frame still to be described, so that seat back 12 is adjustable in its inclination to seat cushion 11.

Seat cushion 11 includes seat frame 20, which is adjustable as to height in seat framework 13 and is adjustable in its inclination with respect to vehicle floor 10, as well as a seat upholstery 21 which is stretched on a cushion shell 22. Cushion shell 22 is held longitudinally shiftable within limits in seat frame 20, for setting the seat or cushion depth, that is, the distance of the front edge of seat upholstery 21 to seat back upholstery 18, for which cushion shells 22 are connected to seat frame 20 via front and rear cushion guides. All adjustment movements on the vehicle seat, that is, the shifting of seat framework 13 in guide rails 15, the height adjustment of seat cushion 11 in seat framework 13, the inclination of seat cushion 11 with respect to seat framework 13, the longitudinal shifting of seat shell 22 having seat upholstery 21 in seat frame 20 and the inclination of seat back 12 with respect to seat cushion 11, etc., are carried out using electric motors. In this regard, electric motors and gear systems for transmitting the adjusting force to the appropriate parts of the vehicle seat may be provided.

Figure 3:
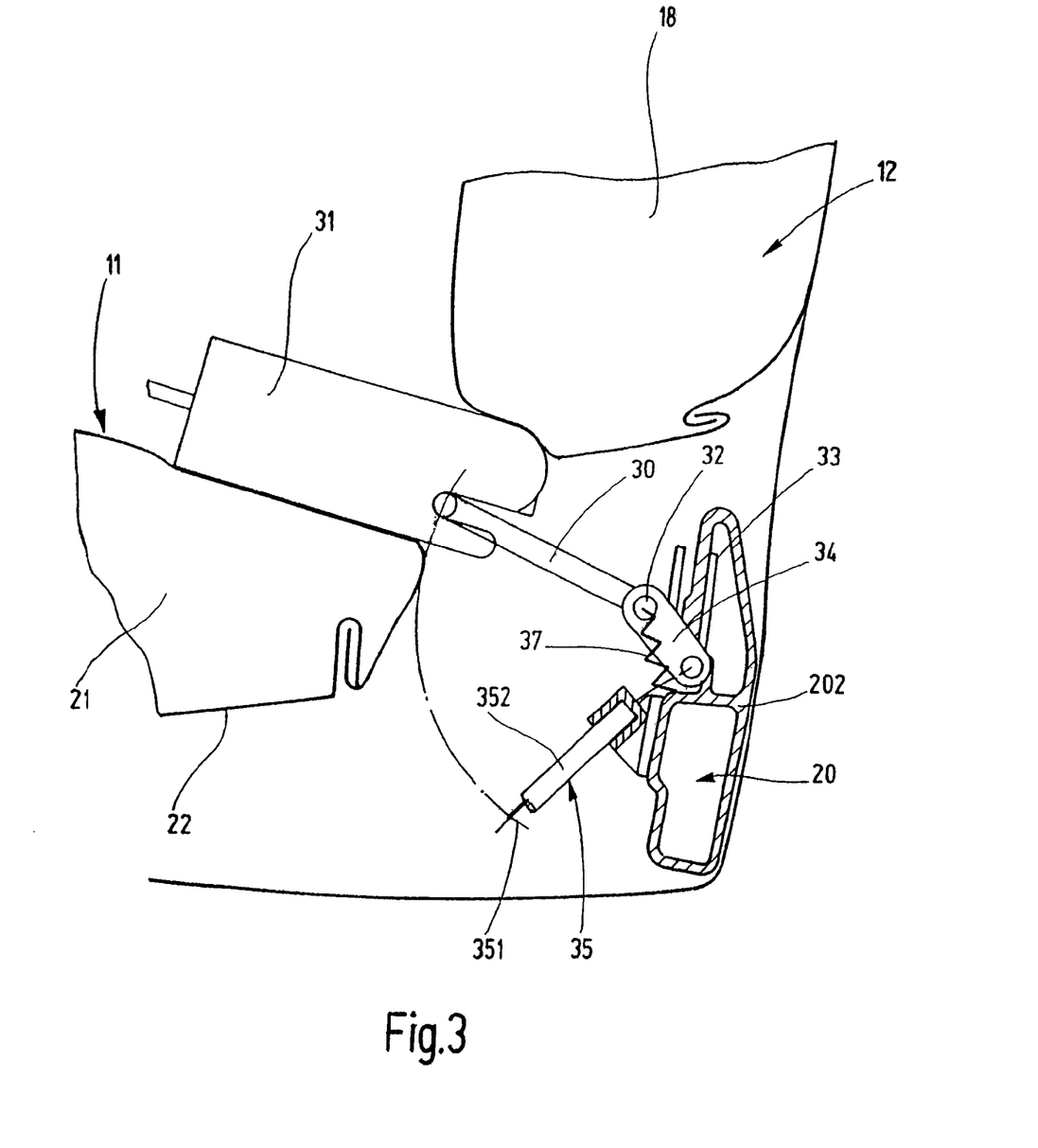
FIG. 3 is a view similar to that illustrated in FIG. 2 having the holding bracket transferred into its functional position.
Figure 4:
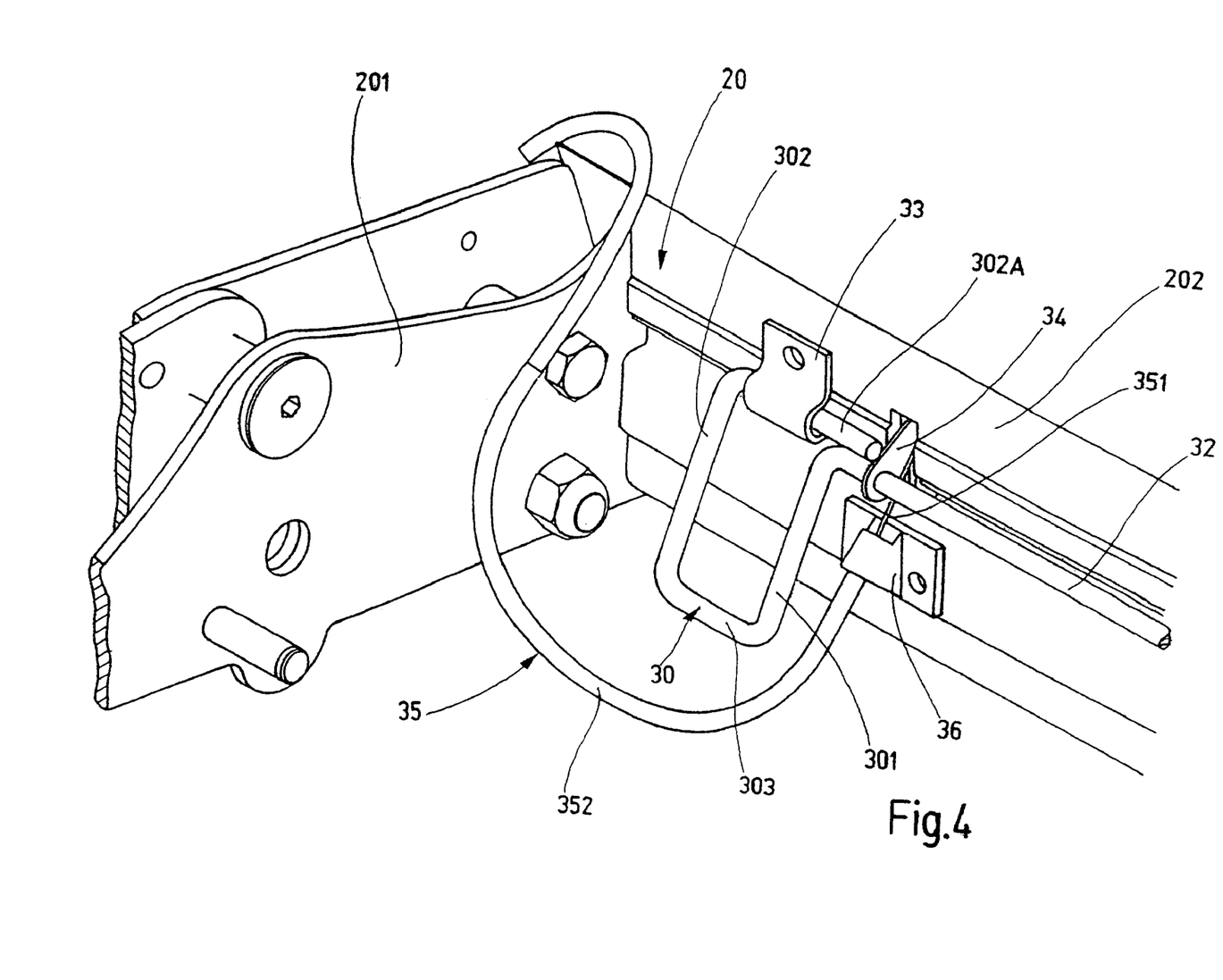
FIG. 4 is a perspective cutaway view of the seat frame of the seat cushion having a holding bracket fixed to it that has a swivel mechanism.
Figure 5:
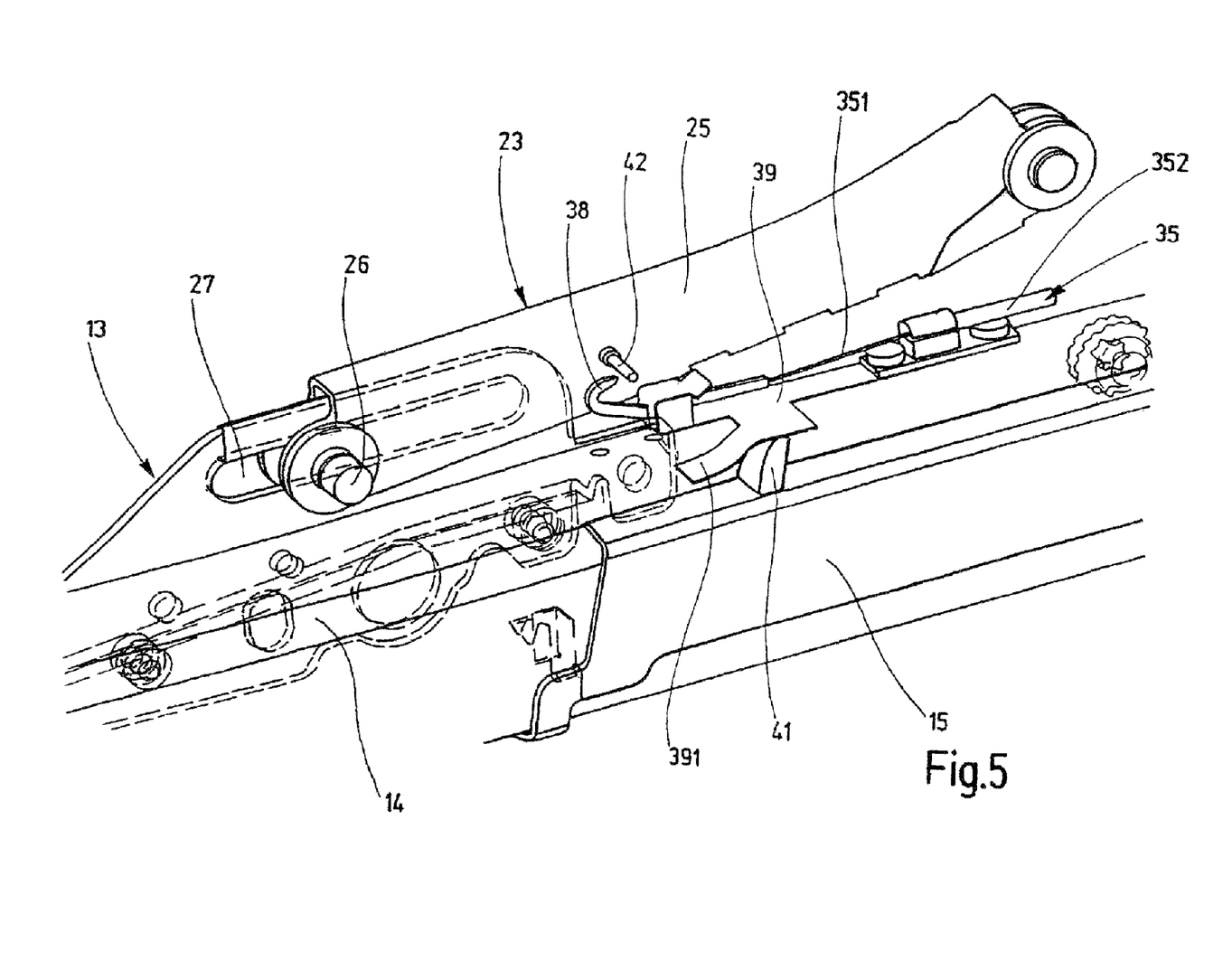
FIG. 5 is a perspective view of a seat framework of the vehicle seat illustrated in FIG. 1.

U-shaped seat frame 20, designed using a hollow profile, has two parallel frame pieces 201 (FIGS. 5 and 4), which extend in the longitudinal direction of guide rails 15, and it also has a frame crossbar 202 (FIGS. 2 to 4) connecting the two frame pieces 201 to each other in one piece, which is located in seat framework 13, below seat back 12, and may be seen in cross-section in FIGS. 2 and 3. In FIG. 1, for making visible the one frame piece 201, a frame panel 29 held to seat frame 20 is indicated in a cutaway view. Seat frame 20 is connected articulatingly to seat framework 13 with its frame pieces 201, on the one hand, via a height-adjusting device 23, and, on the other hand, via an inclination setting device 24 (FIG. 1). Height adjustment device 23 has two adjusting arms 25, each articulated via an angle lever 28 at a frame piece 201. Each adjustment arm 25 engages, using a stud 26 arranged at its one end, in an elongated hole 27 developed in seat framework 13, and is guided shiftably via stud 26 in elongated hole 27 (FIG. 5). At the other end of each adjustment arm 25, one lever end of an angle lever 28 is articulated, and its other lever end is articulated at the one frame piece 201 (FIG. 1). Each angle lever 28 is held swivelably at seat framework 13 about a swivel point 281. In this context, angle lever 28 is arranged such that in response to a forward shifting movement of adjustment arm 25 (to the left in FIGS. 1 and 5), seat frame 20 is lifted, and in response to a backward shifting movement of the adjustment arm (to the right in FIGS. 1 and 5, stud 26 moving into the dashed part of elongated hole 27), seat frame 20 is lowered. The shifting movement of the two adjustment arms 25 of height adjustment device 23 is effected by an electric motor.

For the purpose of fastening a child's seat to the vehicle seat, the vehicle seat is equipped with two holding brackets 30, which each cooperate with a restraining device 31 arranged on the child's seat. In FIGS. 2 to 4, in each case only one holding bracket 30 is illustrated. If holding brackets 30 are in a functional position as illustrated in FIG. 3, in each case one retaining device 31 arranged on the child's seat may be latched in one of the two holding brackets 30, as illustrated in FIG. 3 for a retaining device 31 and a holding bracket 30, and the child's seat may be detachably locked to holding brackets 30.

When the child's seat has been removed from the vehicle seat, in order that holding brackets 30 may not impair sitting comfort or that they may not increase the risk of injury in response to a crash, it is provided, when the child's seat has been removed, that one may swivel holding brackets 30 into a non-use position, in which it is deposited behind seat upholstery 21 and underneath seat back 12, in a covered state. In this context, the swivel mechanics for holding brackets 30 is arranged so that the swivel motion of holding brackets 30 is derived from the height adjustment motion of seat cushion 11.

The two holding brackets 30 are rigidly connected to a swivel shaft 32 that is held swivelably on frame crosspiece 202 of seat frame 20, and in the exemplary embodiments are designed as one piece with swivel shaft 32. As FIG. 4 illustrates for a holding bracket 30, to form a holding bracket 30 U-shaped, using a short leg 301 that departs from swivel shaft 32 at right angles and using a long leg 302 extending parallel to it and using a crossbar 303 connecting the two legs 301 and 302 to each other, e.g., in each case, an end section of swivel shaft 32 is bent out. End section 302A of long leg 302, which extends out over short leg 301, is bent over parrallel to crossbar 303 such that the U is closed to form a rectangle. Bent-over end section 302A of long leg 302 is swivelably fastened to frame cross part 202 of seat frame 20 using a clip bracket 33. On swivel shaft 32 there is, rotatably fixed, a swivel level 34, at the free end of which the core assembly 351 of a Bowden cable 35 is fastened. The casing 352 of Bowden cable 35 is fastened at a support member 36. When Bowden cable 35 is operated, swivel lever 34 illustrated in FIGS. 2 to 4 swivels downwardly, and thereby rotates swivel shaft 32 in the clockwise direction, so that swivel lever 34 swivels in the clockwise direction to the function position illustrated in FIG. 3, counter to the force of a return spring 37 (FIGS. 2 and 3).

In order to create the necessary clearance for swiveling holding brackets 30, seat upholstery 21 may be removed from the swivel path of holding brackets 30. For this purpose, cushion shell 22 with seat upholstery 21 fixed on it is moved all the way forward in seat frame 20, with the aid of the electromotive seat depth adjustment device, so that holding brackets 30 are able to swivel past the rear edge of seat upholstery 21 (FIG. 3).

The swivel motion of holding brackets 30, that takes place after seat upholstery 21 moves forward, is derived from the height adjustment movement of seat cushion 11, for which Bowden cable 35 is connected to height adjustment device 23. The derivation of the swivel motion is, in this context, done such that, before the height adjustment path of seat cushion 11 into the maximum possible height position, an adjustment path section is defined such that, upon running through this is adjustment path section, holding brackets 30 execute the described swivel motion from their non-use position into their functional position. For this purpose, the end of core assembly 351 of Bowden cable 35 that is facing away from swivel lever 34 is connected to a coupling part of a coupling. The other coupling part is fastened to adjustment arm 25 of height adjustment device 23. The coupling is normally open, and it is closed at a certain longitudinal shifting position of seat framework 13 in guide rails 15, so that, by the operation of height adjustment device 23, the swiveling out of holding brackets 30 from their non-use position is carried out.

As illustrated in FIG. 5, in the exemplary embodiment described, the one coupling part is formed by a hook 38, which is firmly connected to the end of core assembly 351 of Bowden cable 35, and is arranged on a leaf spring 39. At its end facing away from the hook, leaf spring 39 is fastened to seat framework 13, to which is fastened a support member 36 for the jacket of Bowden cable 35. At leaf spring 39, a control tab 391 is developed such that it is above one of the two guide rails 15, and when seat framework 13 shifts, it cooperates with a cam lobe 41 fastened on guide rail 15. The other coupling part is developed as a locking pin 42, which projects horizontally from adjustment arm 25 towards hook 38. If control tab 391 of leaf spring 39 extends onto cam lobe 41, the free end of leaf spring 39 which carries hook 38 is lifted up so far that hook 38 is located in the shifting path of locking pin 42, when adjustment arm 25 is shifted by the operation of height adjustment device 23.

Upon the transferring of holding brackets 30 into their functional position illustrated in FIG. 3, one proceeds as follows:

Seat upholstery 21 is pushed forward the maximum amount in seat frame 20, so that the seat gets the maximum possible seat depth. For this, the electromotive cushion depth adjustment is operated which moves forward cushion shell 22 in the guides in seat frame 20. At this point the entire seat is moved backwards, that is, set back the maximum amount, via the electromotive longitudinal adjustment. Cam lobe 41 is placed on the one guide rail 15 such that, in this shifted position of seat framework 13, control tab 391 extends onto cam lobe 41, and thereby the front end of leaf spring 39, and thus hook 38, are lifted up. Hook 38 is located with its hook opening in front of locking pin 42. If height adjustment device 23 is switched on, adjustment arm 25 shifts forwardly, whereby seat frame 20 is lifted up. As of a certain shift path of adjustment arm 25, locking pin 42 engages with the hook opening of lifted hook 38, and, upon further shifting of adjustment arm 25, hook 38 is carried along. Hook 38 swivels Bowden cable 35 via swivel lever 34, and the latter swivels swivel shaft 32, so that the two holding brackets 30 are transferred into their functional position (FIG. 3), in which they penetrate the clearance space between seat upholstery 21 and seat back upholstery 18. The child's seat may be set onto the vehicle seat that is provided with the maximum seat depth and cushion depth, and may be secured with its two retaining devices 31 in holding brackets 30.

Figure 2:
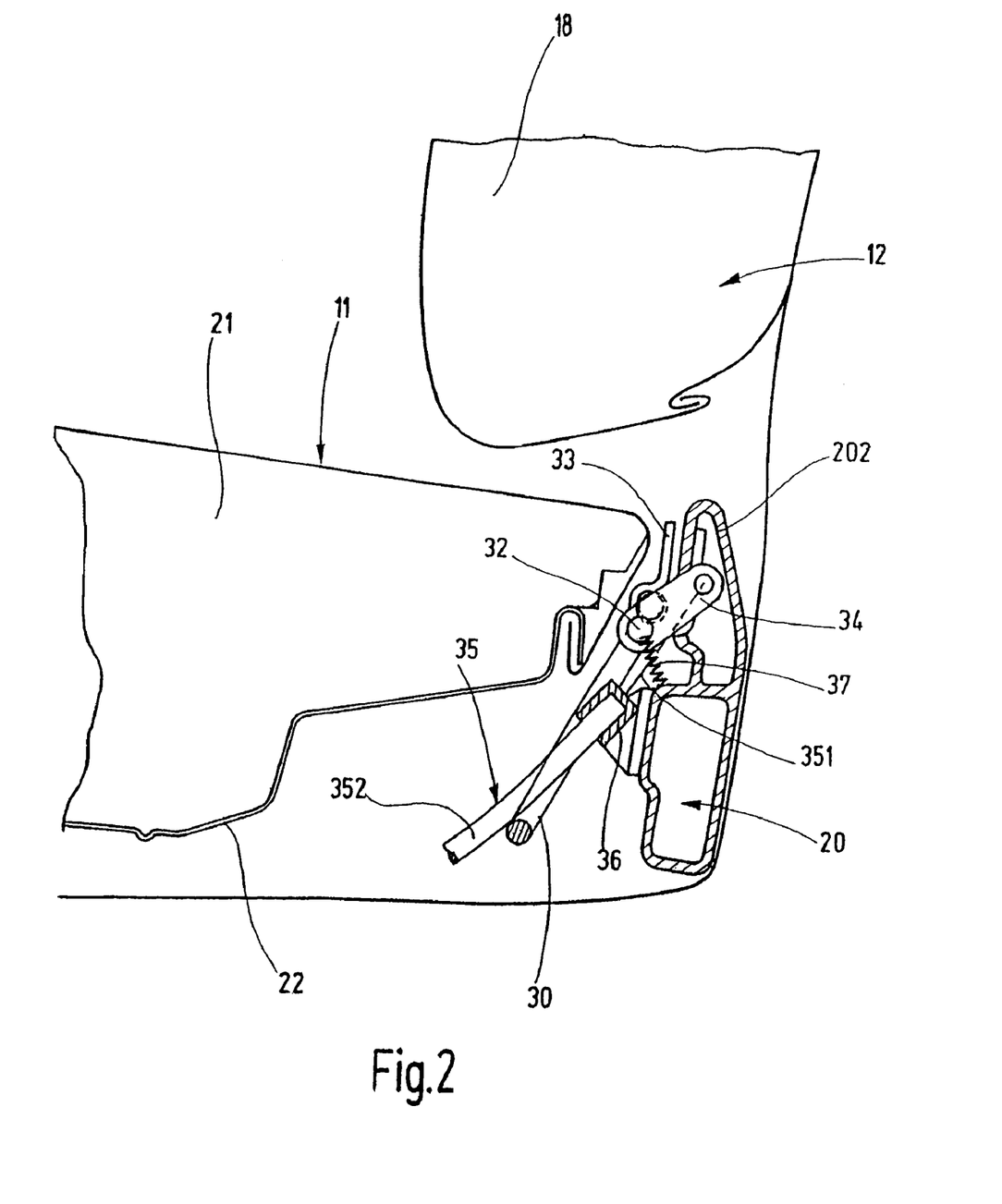
FIG. 2 is a side view of a swivel mechanism arranged at the seat frame for at least one holding bracket for securing the child's seat in the non-use position of the holding bracket.

Once the child's seat has been removed from the vehicle seat again, the procedure for swiveling back holding brackets 30 into their non-use position, illustrated in FIG. 2, is reversed, namely, first of all height adjustment device 23 is brought back into the predetermined position, in which locking pin 42 moves out of the hook opening of hook 38. During this procedure, return spring 37 swivels holding brackets 30 in the counterclockwise direction into their non-use position. If the vehicle seat is brought out of its maximum setting back, or cam lobe 41 is dismounted from guide rail 15, then any desired height setting of seat cushion 11 may be undertaken.

It may be provided, in the case of vehicle seats having so-called seat memory, in which individual seat setting positions for various vehicle passengers are stored and retrieved again, and are set automatically electromotively, to program a child's seat mode into the seat memory in which the seat settings described are stored, which are required for the accommodation of the child's seat and for swiveling holding brackets 30. If the child's seat mode is selected, the appropriate seat settings are retrieved from the memory and are carried out one after the other in the manner described, so that the transfer of holding brackets 30 into their functional position may be automatically triggered by pushing a button.

The described exemplary embodiment should be understood as not limiting. Thus, instead of the Bowden cable, a different activation of the holding brackets may be provided. For instance, a lever system, an electrical, a pneumatic, a hydraulic device, etc., may be used.

What is claimed is:

1. A vehicle seat, comprising:
   a seat framework anchored to a vehicle floor in a longitudinally shiftable manner;
   a seat cushion including a seat upholstery, the seat cushion arranged in the seat framework in a vertically adjustable manner, the seat upholstery arranged longitudinally shiftable in the seat framework;
   a seat back including a seat back upholstery and arranged on the seat framework; and
   at least one swivelable holding bracket on the seat framework adapted to detachably fasten a child seat that is set upon the seat cushion, the holding bracket swivelable from a covered non-use position to a use position, in the use position the holding bracket penetrating through a lower edge of the seat back upholstery and a rear edge of the seat upholstery and accessible to a retaining device fixed on the child seat, in a longitudinal displacement position of the seat upholstery in which the seat upholstery is moved out of a swivel path of the holding bracket, swivel motion of the holding bracket is derived from a vertical adjustment motion of the seat cushion.

2. The vehicle seat according to claim 1, wherein before an end of a vertical adjustment path of the seat cushion, an adjustment path section is provided, the holding bracket swivelable between the non-use position and the use position in response passing through to the adjustment path section.

3. The vehicle seat according to claim 2, wherein the seat cushion achieves a maximum possible vertical setting at an end of the adjustment path section.

4. The vehicle seat according to claim 1, further comprising:
   guide rails fastened to the vehicle floor, the seat framework arranged longitudinally shiftable on the guide rails, the seat framework include a height-adjustable seat frame, the seat cushion held longitudinally shiftable in the seat frame;
   a vertical adjustment device engaged at the seat framework and at the seat frame configured to vertically adjust the seat cushion in the seat framework;
   a two-part coupling including a first coupling part arranged on the vertical adjustment device and a second coupling part arranged on the seat framework; and
   a control member fastened at at least one guide rail and configured to push, in a fixed longitudinal displacement position of the seat cushion, the second coupling part into a motion path of the first coupling part to carry the second coupling part along with the first coupling part.

5. The vehicle seat according to claim 4, wherein the seat cushion includes a seat shell, the seat upholstery arranged to rest in the seat shell, the seat shell connected to the seat frame via longitudinal guides.

6. The vehicle seat according to claim 4, wherein the vertical adjustment device includes an adjustment arm longitudinally shiftable for vertical adjustment, the adjustment arm connected to the seat frame via a lever mechanism and connected to the seat framework via an extended hole guide, the first coupling part including a locking pin extending from the adjustment arm, the second coupling part including a hook configured to be lifted vertically by the control member connected to the lever mechanism that activates the holding bracket via a Bowden cable.

7. The vehicle seat according to claim 6, wherein the hook is fixed at a free end of a leaf spring fastened in the seat framework, the leaf spring including a control tab bent outwardly and extending into a shifting path of the control member, the control member including a cam lobe onto which, in a specified longitudinal shifting position of the seat framework, the control tab extends and the free end of the leaf spring that carries the hook lifts.

8. The vehicle seat according to claim 4, wherein the seat framework is pushed back to a maximum in the guide rails in the longitudinal shifting position of the seat framework that activates the control member.

9. The vehicle seat according to claim 4, further comprising:
 a memory configured to store seat settings and to retrieve a child seat mode to automatically retrieve the seat setting; and
 an electromotive seat adjustment device configured automatically and electromotively to transfer the holding bracket into the use position in assignment to the child seat mode, to shift the seat upholstery longitudinally in the seat frame, to shift the seat framework longitudinally in the guide rails and to vertically adjust the seat frame in the seat framework.

10. The vehicle seat according to claim 4, further comprising:
 a swivel shaft held in a swivelable manner to the seat frame and extending transversely to a longitudinal axis of the seat, the holding bracket rigidly connected to the swivel shaft; and
 a swivel lever rotatably fixed on the swivel shaft, the swivel lever including a free end configured to engage to a Bowden cable.

11. The vehicle seat according to claim 10, wherein a respective holding bracket is arranged at each end of the swivel shaft.

12. The vehicle seat according to claim 11, wherein each of two end sections of the swivel shaft is bent out in a U-shape to form a holding bracket by a short leg that extends from the swivel shaft at a right angle, a long leg that extends parallel to the short leg and a crossbar that connects the short leg and the long leg to each other, an end section of the long leg extending out over the short leg and bent over parallel to the crossbar to close the U to form a rectangle, the end section of the long leg swivelably fastened to a cross part of the seat frame by a clip bracket.

\* \* \* \* \*